United States Patent
McMahan et al.

(10) Patent No.: US 12,420,938 B2
(45) Date of Patent: Sep. 23, 2025

(54) MISALIGNMENT LATCH FOR AN AIRCRAFT SYSTEM

(71) Applicant: Rohr, Inc., Chula Vista, CA (US)

(72) Inventors: Paul F. McMahan, College Station, TX (US); Braskel Phillips, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 19 days.

(21) Appl. No.: 18/141,825

(22) Filed: May 1, 2023

(65) Prior Publication Data
US 2024/0367804 A1 Nov. 7, 2024

(51) Int. Cl.
*B64D 29/06* (2006.01)
*E05C 19/14* (2006.01)
*F02K 1/80* (2006.01)

(52) U.S. Cl.
CPC ............ *B64D 29/06* (2013.01); *E05C 19/145* (2013.01); *F02K 1/80* (2013.01)

(58) Field of Classification Search
CPC ......... B64D 29/06; B64D 29/08; F02K 1/766; F02K 1/80; E05C 1/08; E05C 19/145
See application file for complete search history.

(56) References Cited

U.S. PATENT DOCUMENTS

| | | | |
|---|---|---|---|
| 1,482,494 A | 2/1924 | Weiss | |
| 1,490,575 A | 4/1924 | Masury | |
| 2,695,803 A * | 11/1954 | Mills | E05C 19/145 292/DIG. 31 |
| 3,083,426 A * | 4/1963 | Neilson | E05C 19/145 24/68 T |
| 3,618,995 A | 11/1971 | McLean | |
| 3,782,765 A | 1/1974 | Wallyn | |
| 4,183,564 A | 1/1980 | Poe | |
| 5,152,559 A * | 10/1992 | Henrichs | B64D 29/06 292/DIG. 31 |
| 5,241,725 A | 9/1993 | Hamatani | |
| 7,275,285 B1 | 10/2007 | Lorell | |
| 9,273,488 B1 * | 3/2016 | Yu | B64D 29/06 |
| 10,155,580 B1 | 12/2018 | Neal | |
| 2010/0154397 A1 * | 6/2010 | Brinkmeyer | F01N 13/1811 60/324 |
| 2011/0308634 A1 | 12/2011 | Mouton | |
| 2014/0133977 A1 * | 5/2014 | Billault | F01D 25/243 415/214.1 |

(Continued)

OTHER PUBLICATIONS

EP Search Report for EP Patent Application No. 24173647.9 dated Oct. 11, 2024.

*Primary Examiner* — Andrew H Nguyen
(74) *Attorney, Agent, or Firm* — Getz Balich LLC (57) ABSTRACT

An assembly is provided for an aircraft. This aircraft assembly includes a keeper and a latch. The keeper includes a keeper bearing surface with a semi-spherical geometry. The latch includes a handle and a hook structure operatively coupled to the handle. The handle is configured to move between a closed position and an open position. The hook structure includes a hook bearing surface with a semi-spherical geometry. The hook bearing surface is engaged with the keeper bearing surface when the handle is in the closed position. The hook structure is disengaged from the keeper when the handle is in the open position.

17 Claims, 12 Drawing Sheets

(56) References Cited

U.S. PATENT DOCUMENTS

| | | | |
|---|---|---|---|
| 2016/0146055 A1* | 5/2016 | Kramer | F02K 1/80 248/342 |
| 2019/0300189 A1* | 10/2019 | Ratajac | E05C 3/045 |
| 2020/0339272 A1* | 10/2020 | Shivarudrappa | F02K 1/72 |
| 2022/0195765 A1 | 6/2022 | McMahan | |

* cited by examiner

MISALIGNMENT LATCH FOR AN AIRCRAFT SYSTEM

BACKGROUND

1. Technical Field

This disclosure relates generally to a latch assembly for a structure such as, for example, an aircraft cowl.

2. Background Information

A modern aircraft propulsion system typically includes a gas turbine engine and a nacelle housing and providing an aerodynamic covering for the gas turbine engine. The nacelle may include one or more cowls for covering components of the gas turbine engine. These cowls may be pivotally mounted to a stationary structure enabling those cowls to be opened for providing access to the components underneath. The cowls may be secured in a closed position using one or more latch assemblies. Various types and configurations of latch assemblies are known in the art. While these known latch assemblies have various benefits, there is still room in the art for improvement.

SUMMARY OF THE DISCLOSURE

According to an aspect of the present disclosure, an assembly is provided for an aircraft. This aircraft assembly includes a keeper and a latch. The keeper includes a keeper bearing surface with a semi-spherical geometry. The latch includes a handle and a hook structure operatively coupled to the handle. The handle is configured to move between a closed position and an open position. The hook structure includes a hook bearing surface with a semi-spherical geometry. The hook bearing surface is engaged with the keeper bearing surface when the handle is in the closed position. The hook structure is disengaged from the keeper when the handle is in the open position.

According to another aspect of the present disclosure, another assembly is provided for an aircraft. This aircraft assembly includes a mount, a keeper and a latch. The mount includes a mount bearing surface with a semi-spherical geometry. The keeper includes a keeper bearing surface with a semi-spherical geometry. The keeper bearing surface engages the mount bearing surface. The latch includes a handle and a hook structure operatively coupled to the handle. The handle is configured to move between a closed position and an open position. The hook structure is engaged with the keeper when the handle is in the closed position. The hook structure is disengaged from the keeper when the handle is in the open position.

According to still another aspect of the present disclosure, another assembly is provided for an aircraft. This aircraft assembly includes a mount, a keeper and a latch. The keeper is coupled to the mount through a first bearing. The latch includes a handle and a hook structure operatively coupled to the handle. The handle is configured to move between a closed position and an open position. The hook structure is engaged with the keeper when the handle is in the closed position. The hook structure is coupled to the keeper through a second bearing when the hook structure is engaged with the keeper. The hook structure is disengaged from the keeper when the handle is in the open position.

The first bearing may be configured as or otherwise include a first ball joint. In addition or alternatively, the second bearing may be configured as or otherwise include a second ball joint.

The keeper may also include a second keeper bearing surface with a semi-spherical geometry. The hook structure may include a hook bearing surface with a semi-spherical geometry. The hook bearing surface may be engaged with the second keeper bearing surface when the handle is in the closed position.

The keeper bearing surface may be a convex surface. The hook bearing surface may be a concave surface.

The keeper and the hook structure may form a ball joint at an interface between the keeper bearing surface and the hook bearing surface.

The keeper may include a keeper shaft and a keeper head connected to the keeper shaft. The keeper head may include the keeper bearing surface. The keeper bearing surface may extend circumferentially around a centerline of the keeper shaft.

The keeper bearing surface may be contiguous with a cylindrical surface of the keeper shaft.

The hook structure may include a structure head and a receptacle within the structure head. The hook bearing surface may partially form the receptacle. The keeper head may be received within the receptacle when the hook bearing surface is engaged with the keeper bearing surface.

The hook structure may also include a channel extending longitudinally through the structure head to the hook bearing surface and the receptacle. The keeper shaft may project longitudinally out from the keeper head and through the channel.

The hook structure may also include a keyhole slot extending radially into the structure head to the receptacle. The keeper head may be configured to pass radially through the keyhole slot between the receptacle and an exterior to the hook structure.

The keyhole slot may have a cross-sectional shape that matches a sectional shape of a portion of the keeper at the keeper head.

The aircraft assembly may also include a mount which includes a mount bearing surface with a semi-spherical geometry. The keeper may also include a second keeper bearing surface with a semi-spherical geometry. The second keeper bearing surface may engage the mount bearing surface.

The second keeper bearing surface may be a convex surface. The mount bearing surface may be a concave surface.

The keeper and the mount may form a ball joint at an interface between the second keeper bearing surface and the mount bearing surface.

The keeper may include a keeper shaft and a keeper nut threaded onto the keeper shaft. The keeper nut may include the second keeper bearing surface. The second keeper bearing surface may extend circumferentially around a centerline of the keeper shaft.

The keeper nut may be retained within a receptacle of the mount. The mount bearing surface may partially form the receptacle.

The keeper shaft may be rotationally fixed relative to the mount. The keeper nut may be rotationally fixed relative to the mount.

The aircraft assembly may also include a first structure, a first aircraft component and a second aircraft component. The first aircraft component may be pivotally attached to the fixed structure. The latch may be mounted to the first aircraft component. The second aircraft component may be pivotally attached to the fixed structure. The keeper may be mounted to the second aircraft component.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
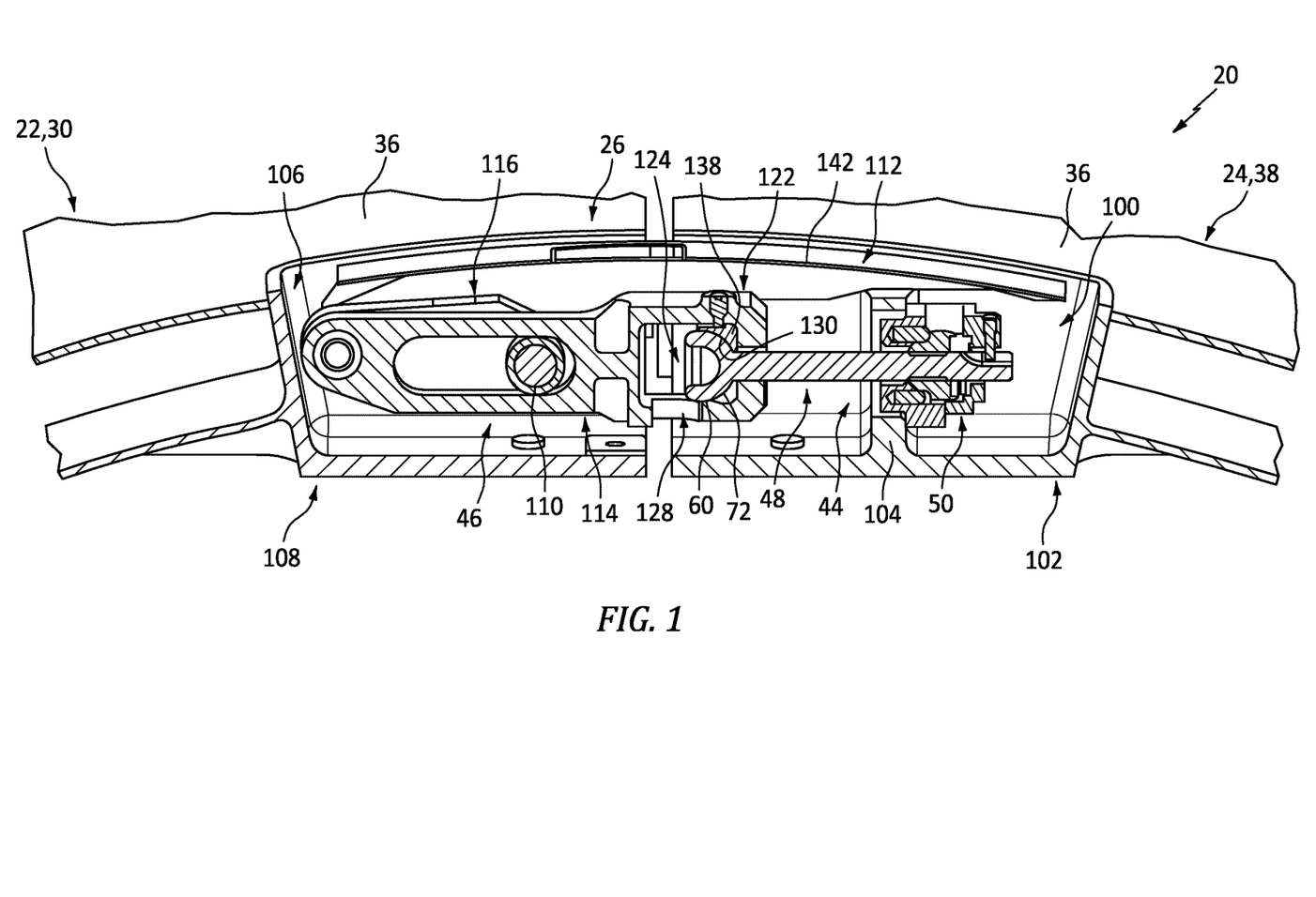
FIG. 1 is a partial cutaway perspective illustration of an aircraft assembly.

FIG. 1 illustrates an assembly 20 for an aircraft structure. An example of the aircraft structure is a nacelle for an aircraft propulsion system, where the nacelle houses an aircraft propulsion system powerplant such as, but not limited to, a gas turbine engine. Another example of the aircraft structure is an aircraft fuselage. The assembly 20 of the present disclosure, however, is not limited to the foregoing exemplary aircraft structures. The assembly 20 of FIG. 1 includes one or more aircraft components 22 and 24 and a misalignment latch assembly 26 configured to accommodate (e.g., slight) misalignment between the aircraft components 22 and 24.

Figure 2:
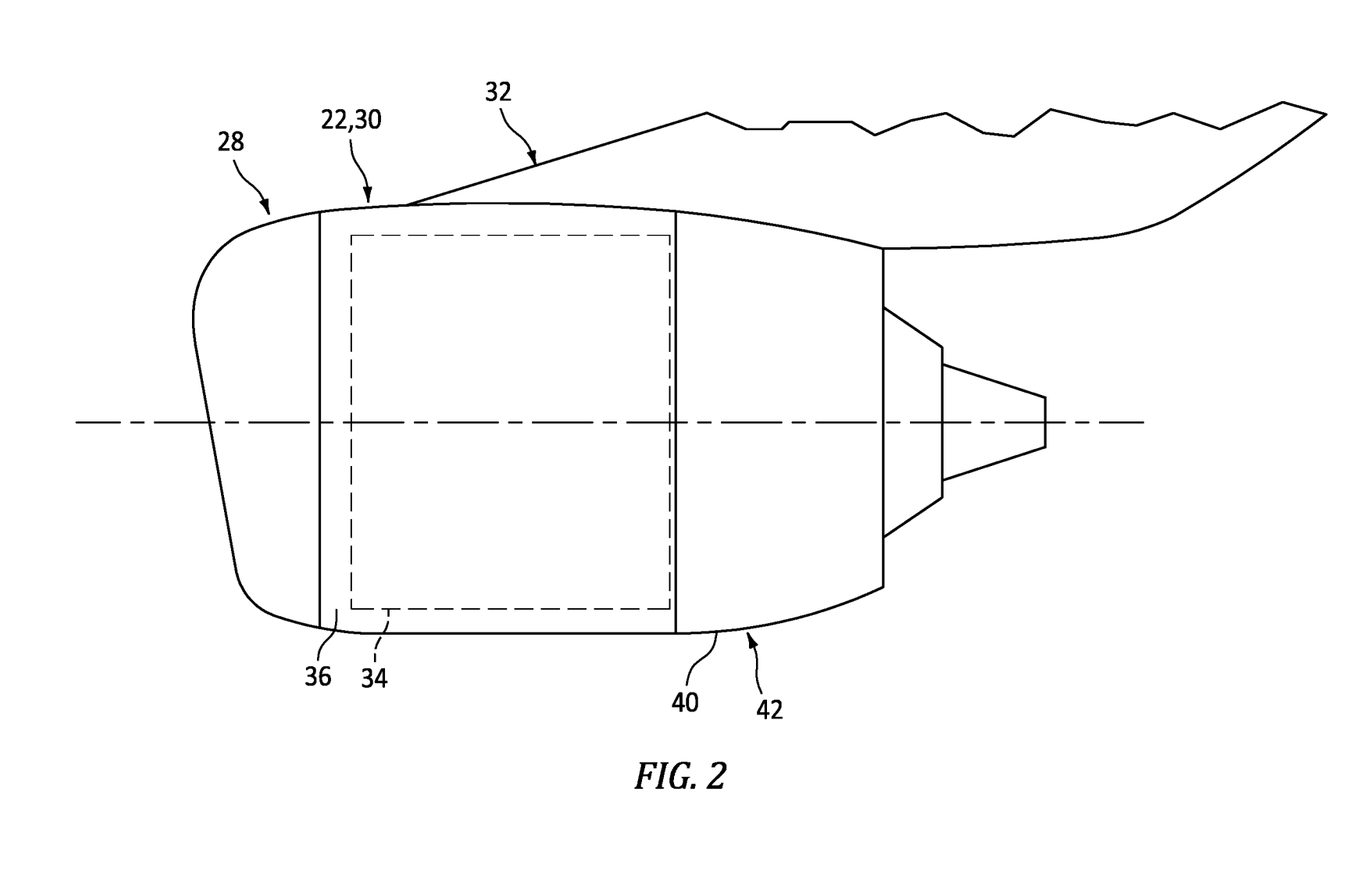
FIG. 2 is a side illustration of an aircraft propulsion system.
Figure 3:
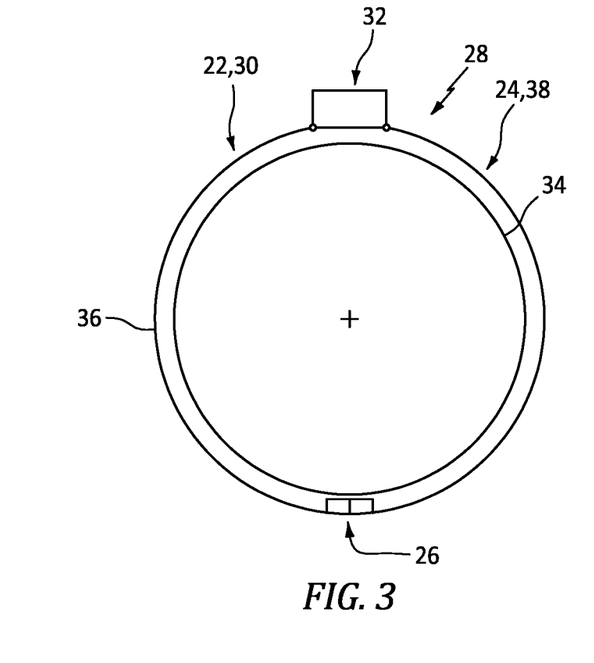
FIG. 3 is a schematic cross-sectional illustration of the aircraft propulsion system with its cowls in closed positions.
Figure 4:
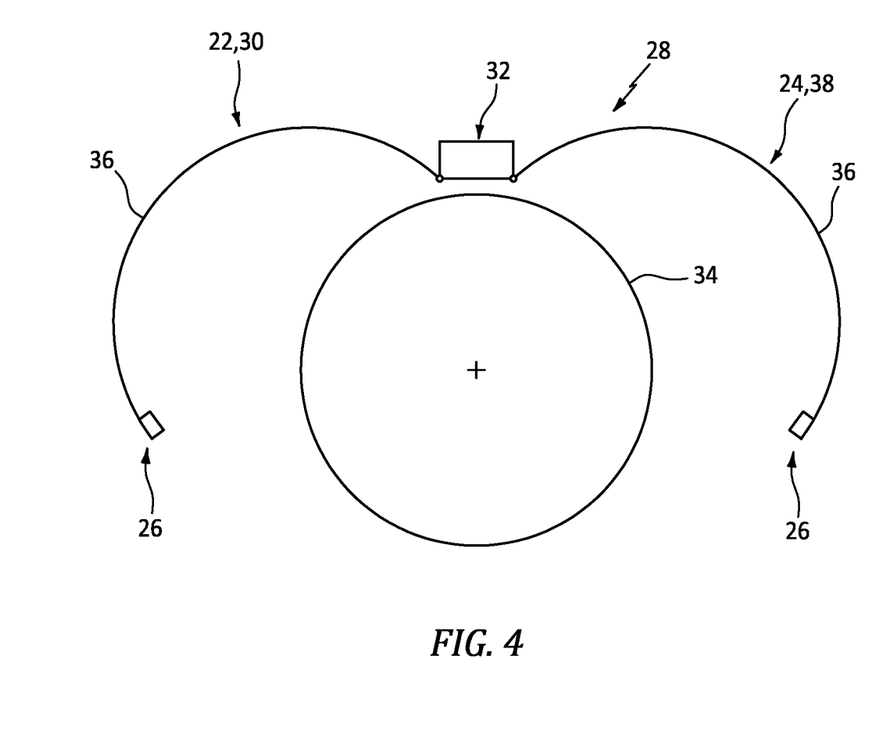
FIG. 4 is a schematic cross-sectional illustration of the aircraft propulsion system with its cowls in open positions.

Referring to FIGS. 2-4, the first component 22 may be configured as part of an outer nacelle structure 28 for the aircraft propulsion system nacelle. The first component 22 of FIGS. 2-4, for example, may be configured as or otherwise include a first fan cowl 30 of the outer nacelle structure 28. This first fan cowl 30 is movably (e.g., pivotally) connected to a stationary structure 32 of the aircraft; e.g., a pylon structure for the aircraft propulsion system. The first fan cowl 30 is configured to move (e.g., pivot) between a fully closed position (e.g., see FIGS. 2 and 3) and a fully open position (e.g., see FIG. 4). In the closed position of FIG. 3, the first fan cowl 30 is configured to house and provide a first side aerodynamic covering for a fan case 34 for the powerplant. The first fan cowl 30 also partially forms an exterior aerodynamic surface 36 of the aircraft propulsion system nacelle.

Referring to FIGS. 3 and 4, the second component 24 may be configured as part of the outer nacelle structure 28. The second component 24 of FIGS. 3 and 4, for example, may be configured as or otherwise include a second fan cowl 38 of the outer nacelle structure 28, which second fan cowl 38 is arranged opposite the first fan cowl 30. This second fan cowl 38 is movably (e.g., pivotally) connected to the stationary structure 32. The second fan cowl 38 is configured to move (e.g., pivot) between a fully closed position (e.g., see FIG. 3) and a fully open position (e.g., see FIG. 4). In the closed position of FIG. 3, the second fan cowl 38 is configured to house and provide a second side aerodynamic covering for the fan case 34. The second fan cowl 38 also further forms the exterior aerodynamic surface 36 of the aircraft propulsion system nacelle.

The aircraft components 22 and 24 may be described herein as the fan cowls 30 and 38 for ease of description. It should be recognized, however, the latch assembly 26 may be configured with other components of the aircraft propulsion system or the aircraft fuselage. For example, referring to FIG. 2, each aircraft component 22, 24 may alternatively be configured as a respective section 40 (e.g., half; one visible in FIG. 2) of a thrust reverser 42, where the thrust reverser section 40 may be movably (e.g., pivotally) attached to the stationary structure 32 or another structure in a similar manner as described above with respect to the respective fan cowl 30, 38. The present disclosure therefore is not limited to any particular aircraft component configurations. Furthermore, while both aircraft components 22 and 24 are described as movable (e.g., pivotable) structures, it is contemplated that one of the aircraft components 22, 24 may alternatively be configured as a fixed structure of the aircraft.

Referring again to FIG. 1, the latch assembly 26 is arranged at an interface between the first component 22 and the second component 24. The latch assembly 26 is configured to lock the (e.g., closed) aircraft components 22 and 24 together when the latch assembly 26 is closed/locked. The latch assembly 26 may thereby secure the first component 22 to the second component 24 when the latch assembly 26 is closed/locked. The latch assembly 26 is also configured to unlock the (e.g., closed) aircraft components 22 and 24 when the latch assembly 26 is open/unlocked. The latch assembly 26 may thereby enable movement of the first component 22 relative to the second component 24 (e.g., pivoting open each aircraft component) when the latch assembly 26 is open/unlocked; e.g., see FIG. 5. The latch assembly 26 of FIG. 1 includes a keeper assembly 44 and a latch 46.

Figure 6:
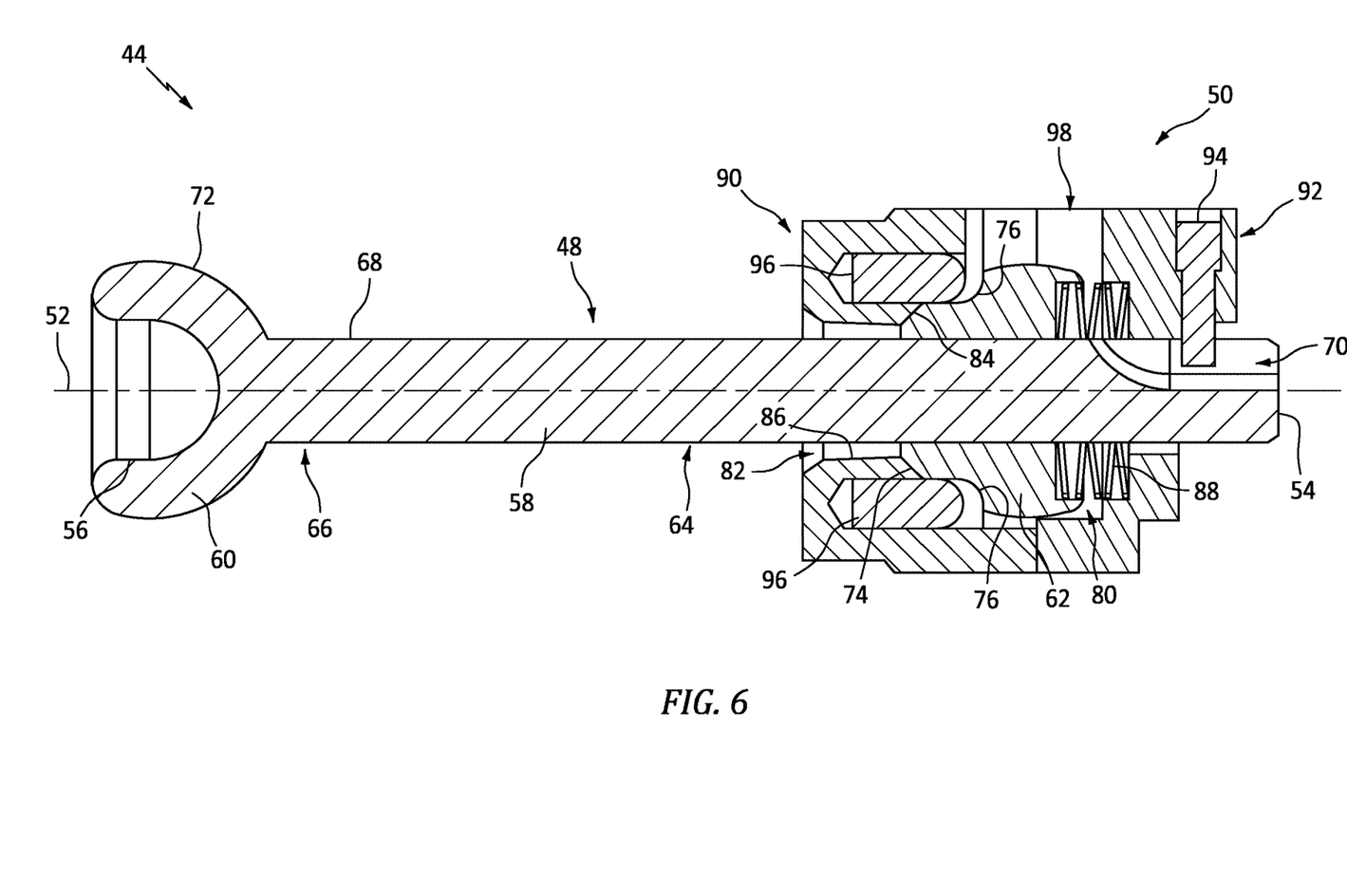
FIG. 6 is a side sectional illustration of a keeper assembly.

Referring to FIG. 6, the keeper assembly 44 includes a keeper 48 and a mount 50. The keeper 48 extends longitudinally along a longitudinal centerline 52 between and to a base end 54 of the keeper 48 and a distal end 56 of the keeper 48. Briefly, this centerline 52 may be a centerline axis of the keeper 48, the mount 50 and/or the keeper assembly 44 in general. The keeper 48 of FIG. 6 includes a keeper shaft 58 and a keeper head 60. The keeper 48 of FIG. 6 also includes a keeper nut 62.

The keeper shaft 58 projects longitudinally along the centerline 52 out from the keeper head 60 to the keeper base end 54. At least a portion 64 of the keeper shaft 58 at the keeper base end 54 is threaded. A portion 66 of the keeper shaft 58 longitudinally adjacent the keeper head 60, however, may have an outer cylindrical surface 68; e.g., may be non-threaded. The keeper shaft 58 of FIG. 6 also includes a shaft notch 70 at the keeper base end 54. This shaft notch 70 projects longitudinally partially into the keeper shaft 58 from the keeper base end 54. The shaft notch 70 projects radially partially into the keeper shaft 58 from a threaded exterior of the keeper shaft 58. The shaft notch 70 extends laterally (e.g., circumferentially or tangentially) within the keeper shaft 58 between opposing lateral notch sides (one notch side visible in FIG. 6).

Figures 7A, 7B:
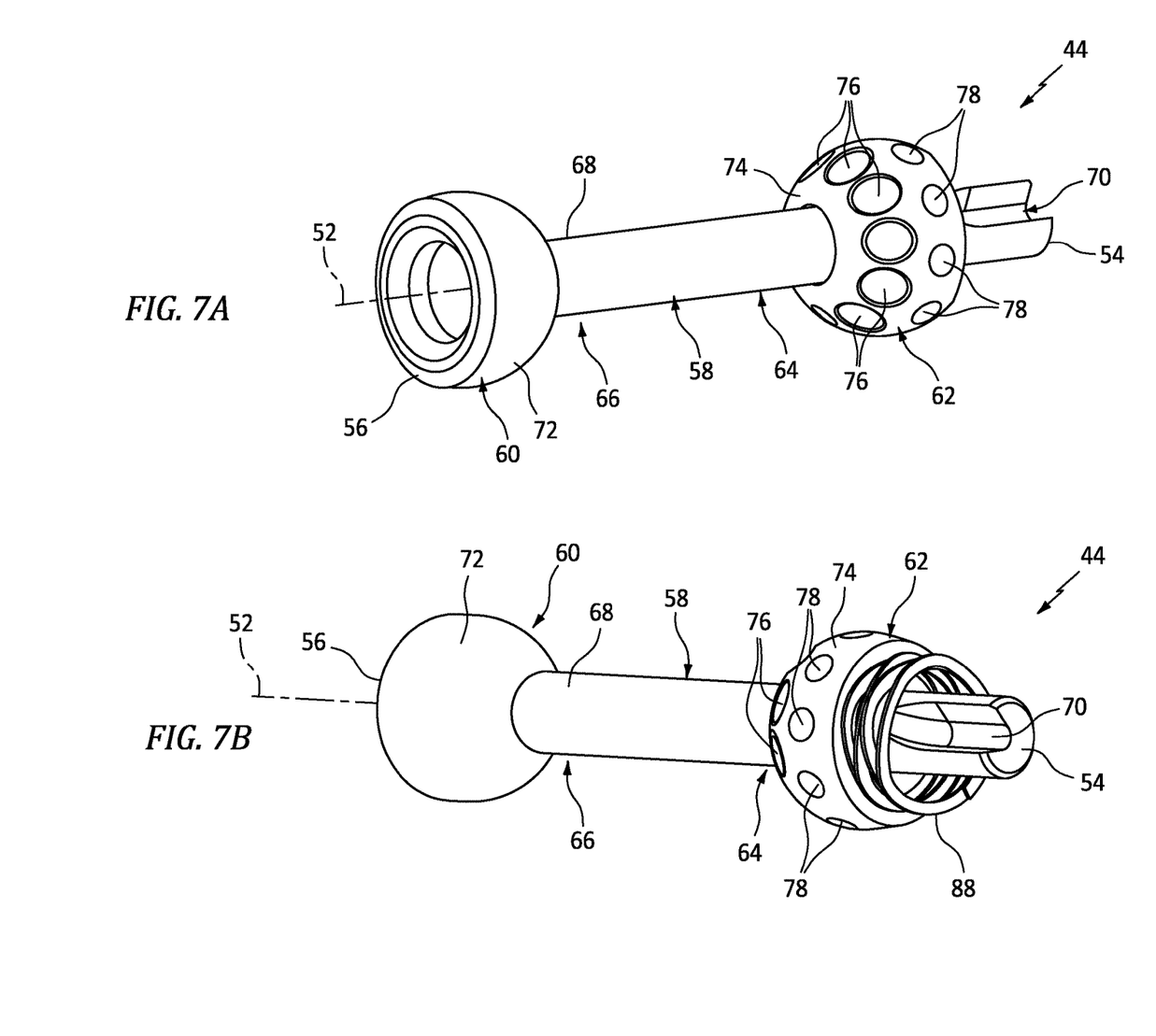
FIGS. 7A and 7B are perspective illustrations of a keeper, where the keeper of FIG. 7B is arranged with a spring element.

The keeper head 60 is connected to (e.g., formed integral with or otherwise attached to) the keeper shaft 58 at the keeper distal end 56. The keeper head 60 includes a head bearing surface 72; more generally, a keeper bearing surface at the keeper distal end 56. The head bearing surface 72 extends circumferentially about (e.g., completely around) the centerline 52. The head bearing surface 72 may be contiguous with (e.g., meet at a corner) the outer cylindrical surface 68 of the keeper shaft 58. Referring to FIGS. 7A and 7B, at least a portion or an entirety of the head bearing surface 72 may have a semi-spherical geometry. Here, the head bearing surface 72 is convex. The keeper head 60 may thereby be configured as a ball joint end.

The keeper nut 62 is mated with the keeper shaft 58 at or towards the keeper base end 54. The keeper nut 62, in particular, is threaded onto the keeper shaft 58. This keeper nut 62 includes a nut bearing surface 74; more generally, a keeper bearing surface on the keeper nut 62 and/or at or towards the keeper base end 54. The nut bearing surface 74 extends circumferentially about (e.g., completely around) the centerline 52. The nut bearing surface 74 may be contiguous (or close to contiguous) with the threaded portion 64 of the keeper shaft 58 when the keeper nut 62 is threaded onto the keeper shaft 58. At least a portion or an entirety of the nut bearing surface 74 may have a semi-spherical geometry. Here, the nut bearing surface 74 is convex. The nut head may thereby be configured as another ball joint end. The nut bearing surface 74 of FIGS. 7A and 7B longitudinally faces (e.g., is longitudinally opposing) the head bearing surface 72 such that a section of the keeper shaft 58 extends between and to the bearing surfaces 72 and 74.

The keeper nut 62 of FIG. 7A also includes one or more detents 76 and/or one or more grips 78. The detents 76 of FIG. 7A are arranged circumferentially (e.g., equispaced) about the centerline 52 in an annular array; e.g., a circular array. Each of these detents 76 may be formed by a recess, a notch or another blind aperture which projects longitudinally partially onto the keeper nut 62 from the nut bearing surface 74. The grips 78 of FIG. 7A are arranged circumferentially (e.g., equispaced) about the centerline 52 in an annular array; e.g., a circular array. Each of these grips 78 may be formed by a recess, a notch or another blind aperture which projects radially partially onto the keeper nut 62 from the nut bearing surface 74. The array of the grips 78 of FIG. 7A is disposed longitudinally between the array of the detents 76 and the keeper base end 54.

Figure 8:
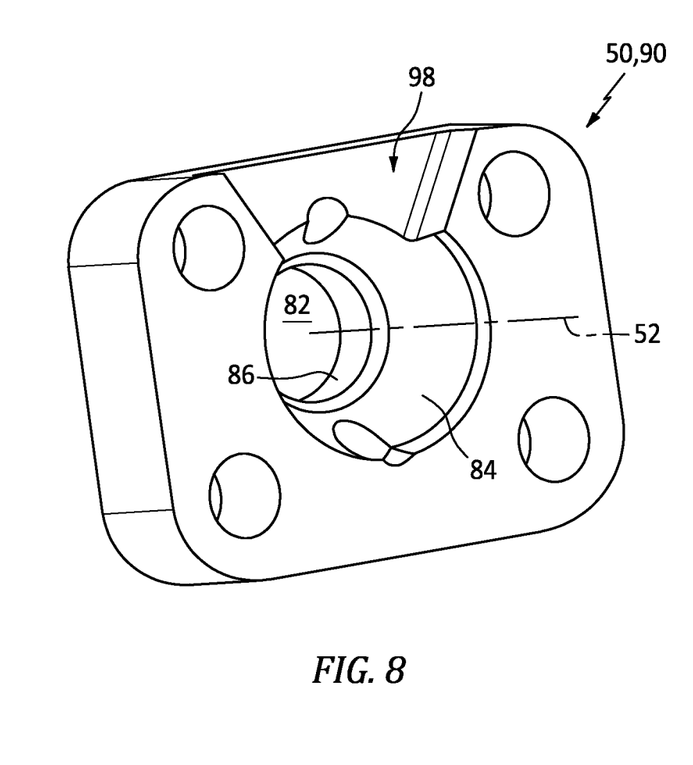
FIGS. 8 and 9 are perspective illustrations of various segments of a mount.

Referring to FIG. 6, the mount 50 includes an internal mount receptacle 80 and a mount channel 82. The mount receptacle 80 is disposed within the mount 50. The mount receptacle 80, for example, extends longitudinally along the centerline 52 within the mount 50. The mount receptacle 80 also extends radially within the mount 50. The mount receptacle 80 is partially formed by a mount bearing surface 84; see also FIG. 8. This mount bearing surface 84 extends circumferentially about (e.g., completely around) the centerline 52. The mount bearing surface 84 may be contiguous (or close to contiguous) with an outer surface 86 of the mount channel 82. Referring to FIG. 8, at least a portion or an entirety of the mount bearing surface 84 may have a semi-spherical geometry that complements the geometry of the nut bearing surface 74 of FIGS. 7A and 7B. The mount bearing surface 84 of FIG. 8 is concave.

Referring to FIG. 6, the mount channel 82 projects longitudinally into the mount 50 to the mount receptacle 80 and the mount bearing surface 84. The outer surface 86 of the mount channel 82 may have a tapered tubular (e.g., frustoconical) geometry, where the outer surface 86 radially tapers towards the centerline 52 as the mount channel 82 longitudinally extends toward (e.g., to) the mount receptacle 80.

The mount 50 is mated with the keeper 48. More particularly, the keeper nut 62 is disposed within the mount receptacle 80 and the keeper shaft 58 extends longitudinally through the mount channel 82. Within the mount receptacle 80, the nut bearing surface 74 engages (e.g., contacts) the mount bearing surface 84. This engagement may be maintained by arranging a spring element 88 (e.g., a coil spring, a wave spring, etc.) within the mount receptacle 80 between a backside of the keeper nut 62 and a back wall of the mount 50. In particular, the spring element 88 may bias the keeper nut 62 and its nut bearing surface 74 against the mount 50 and its mount bearing surface 84. With this arrangement, (a) the keeper 48 and its keeper nut 62 and (b) the mount 50 may form a ball joint (e.g., a spherical bearing) at the interface between the nut bearing surface 74 and the mount bearing surface 84. The keeper nut 62 may thereby rotate slightly (e.g., +/−2-3° from center) in one or more or any radial direction relative to the centerline 52. This may facilitate up-and-down and/or side-to-side movement of the keeper 48 relative to the second component 24 of FIG. 1.

Figure 9:
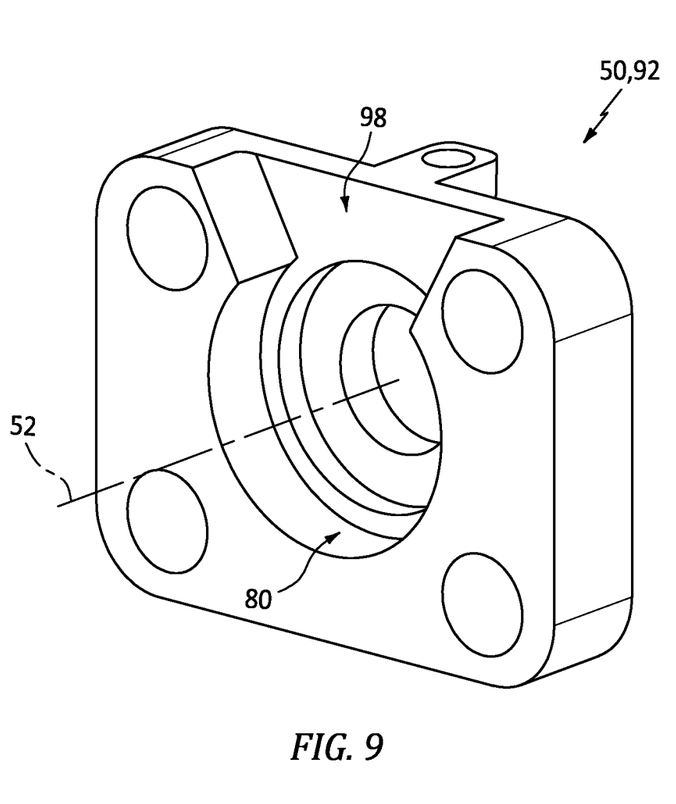

To facilitate placement of the keeper nut 62 within the mount receptacle 80, the mount 50 may be configured from a plurality of mount segments 90 and 92; e.g., longitudinal halves. Examples of these mount segments 90 and 92 are respectively shown in FIGS. 8 and 9; however, the present disclosure is not limited to such an exemplary arrangement.

Referring to FIG. 6, to prevent or limit rotation of the keeper shaft 58 about the centerline 52 relative to the mount 50, a shaft locator 94 (e.g., a set screw) may project radially into the shaft notch 70. This shaft locator 94 is fixed to the mount 50. The shaft locator 94 may thereby rotationally fix or otherwise restrain the keeper shaft 58 to the mount 50. However, the shaft locator 94 may move longitudinally within the shaft notch 70.

To prevent or limit rotation of the keeper nut 62 relative to the keeper shaft 58, one or more nut locators 96 (e.g., pins) may project longitudinally into one or more respective detents 76. Each of these nut locators 96 is fixed to the mount 50 and its mount segment 90. The nut locators 96 may thereby rotationally fix or otherwise restrain the keeper nut 62 to the mount 50 and, thus, the keeper shaft 58. However, the nut locators 96 may be disengaged from the detents 76 by pushing the keeper shaft 58 and, thus, the keeper nut 62 longitudinally towards the spring element 88; e.g., compressing the spring element 88. The keeper nut 62 may then be rotated about the keeper shaft 58 and the centerline 52 to adjust an operative length of the keeper assembly 44; e.g., a longitudinal distance between the keeper head 60 and the mount 50. To facilitate rotation of the keeper nut 62, a tool may be inserted through a window 98 (e.g., a port) in a sidewall of the mount 50 to engage (e.g., project into) at least one of the grips 78.

Referring to FIG. 1, the mount 50 attaches the keeper 48 to the second component 24. The mount 50, for example, may be disposed within a channel 100 in a fitting 102 of the second component 24. The mount 50 may be connected (e.g., mechanically fastened) to a flange 104 extending across the second component channel 100 with, for example, one or more fasteners; e.g., bolts. Here, the flange 104 is disposed longitudinally between the mount 50 and the keeper head 60.

The latch 46 is (e.g., movably) mounted to the first component 22. The latch 46, for example, may be disposed within a channel 106 in a fitting 108 of the first component 22. A latch pin 110 may extend through at least one component of the latch 46 and across the channel 106 in the first component fitting 108. Each end of the latch pin 110 may be connected to a respective side (e.g., flange, wall, etc.) of the first component fitting 108. The latch pin 110 may form a latch axis (e.g., a pivot axis) about which the latch 46 may pivot and move between its closed/locked arrangement (e.g., see FIG. 1) and its open/unlocked arrangement (e.g., see FIG. 5).

The latch 46 of FIG. 1 includes a handle 112 and a hook structure 114. The latch 46 also includes one or more intermediate linkages 116 (see also FIG. 5) operatively coupling the handle 112 to the hook structure 114. These intermediate linkages 116 may be disposed on opposing lateral sides of the hook structure 114. Each intermediate linkage 116 may include one or more links. Each intermediate linkage 116, for example, may be configured as a double scissor link linkage; the present disclosure, however, is not limited to such an exemplary intermediate linkage configuration.

Figure 10:
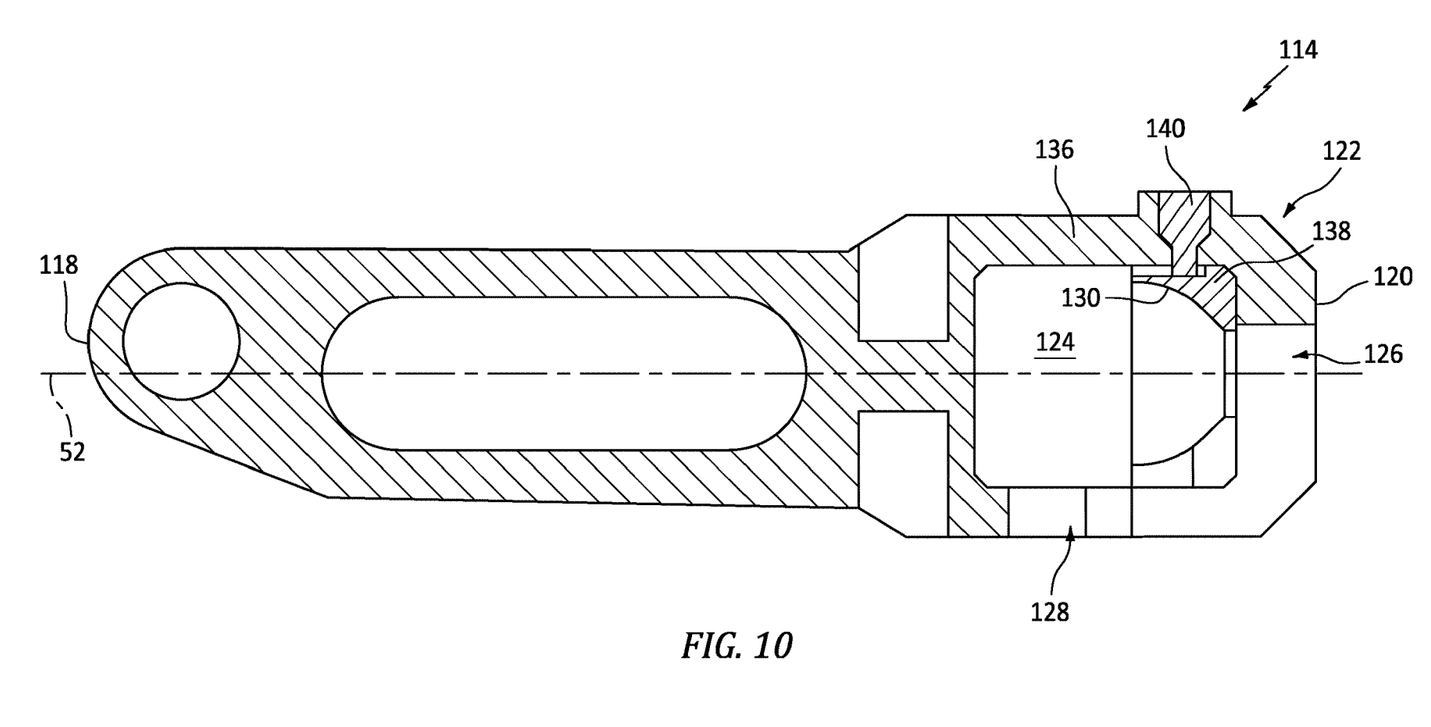
FIG. 10 is a side sectional illustration of a hook structure.

Referring to FIG. 10, the hook structure 114 may extend longitudinally along the centerline 52 between and to a base end 118 of the hook structure 114 and a distal end 120 of the hook structure 114. Briefly, when the latch 46 of FIG. 1 is closed, the centerline 52 may be a centerline axis of the hook structure 114. The hook structure 114 of FIG. 10 includes a hook structure head 122 disposed at the structure distal end 120. The structure head 122 of FIG. 10 includes an internal structure receptacle 124, a structure channel 126 and a structure slot 128.

Figure 11:
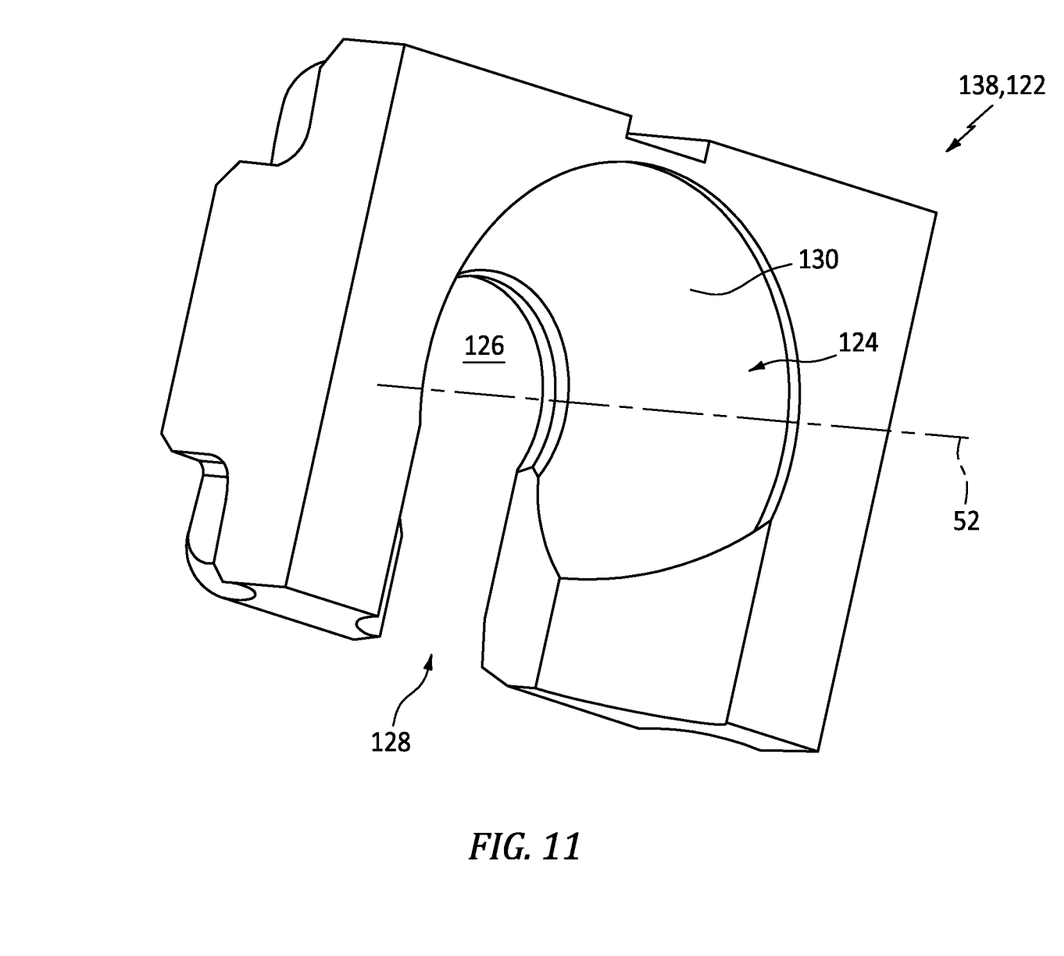
FIG. 11 is a perspective illustration of a receiver for the hook structure.

The structure receptacle 124 is disposed within the hook structure 114 and its structure head 122. The structure receptacle 124, for example, extends longitudinally along the centerline 52 within the hook structure 114 and its structure head 122. The structure receptacle 124 also extends radially within the hook structure 114 and its structure head 122. The structure receptacle 124 is partially formed by a hook bearing surface 130. This hook bearing surface 130 extends circumferentially about (e.g., completely around) the centerline 52. Referring to FIG. 11, at least a portion or an entirety of the hook bearing surface 130 may have a semi-spherical geometry that complements the geometry of the head bearing surface 72 of FIGS. 7A and 7B. The hook bearing surface 130 of FIG. 11 is concave.

Referring to FIG. 10, the structure channel 126 projects longitudinally into the hook structure 114 and its structure head 122 to the structure receptacle 124 and the hook bearing surface 130. The structure slot 128 projects radially into the hook structure 114 and its structure head 122 to the structure receptacle 124 and the structure channel 126. This structure slot 128 may be configured as a keyhole slot. The structure slot 128 of FIG. 12, for example, may have a cross-sectional shape that matches (e.g., is the same as, substantially follows, etc.) a sectional shape of a portion of the keeper 48 at the keeper head 60/at the keeper distal end 56. These matching shapes may be viewed in a reference plane parallel with the centerline 52 and/or parallel with an exterior face plane of the structure slot 128. The structure slot 128 of FIG. 12, for example, includes a shaft portion 132 and a head portion 134. The shaft portion 132 extends longitudinally from the structure distal end 120 to the head portion 134. The shaft portion 132 has a lateral width that is sized smaller than a lateral width of the head portion 134. The shaft portion 132 of FIG. 12 has a rectangular cross-sectional shape. The head portion 134 of FIG. 12 has a polygonal cross-sectional shape that laterally tapers to the shaft portion 132. The head portion shape, for example, may be formed by a combination of an isosceles trapezoid section and a rectangular section, where the isosceles trapezoid section provides a tapered transition from the rectangular section to the rectangular shape of the shaft portion 132. The present disclosure, however, is not limited to such an exemplary keyhole slot configuration.

Figure 12:
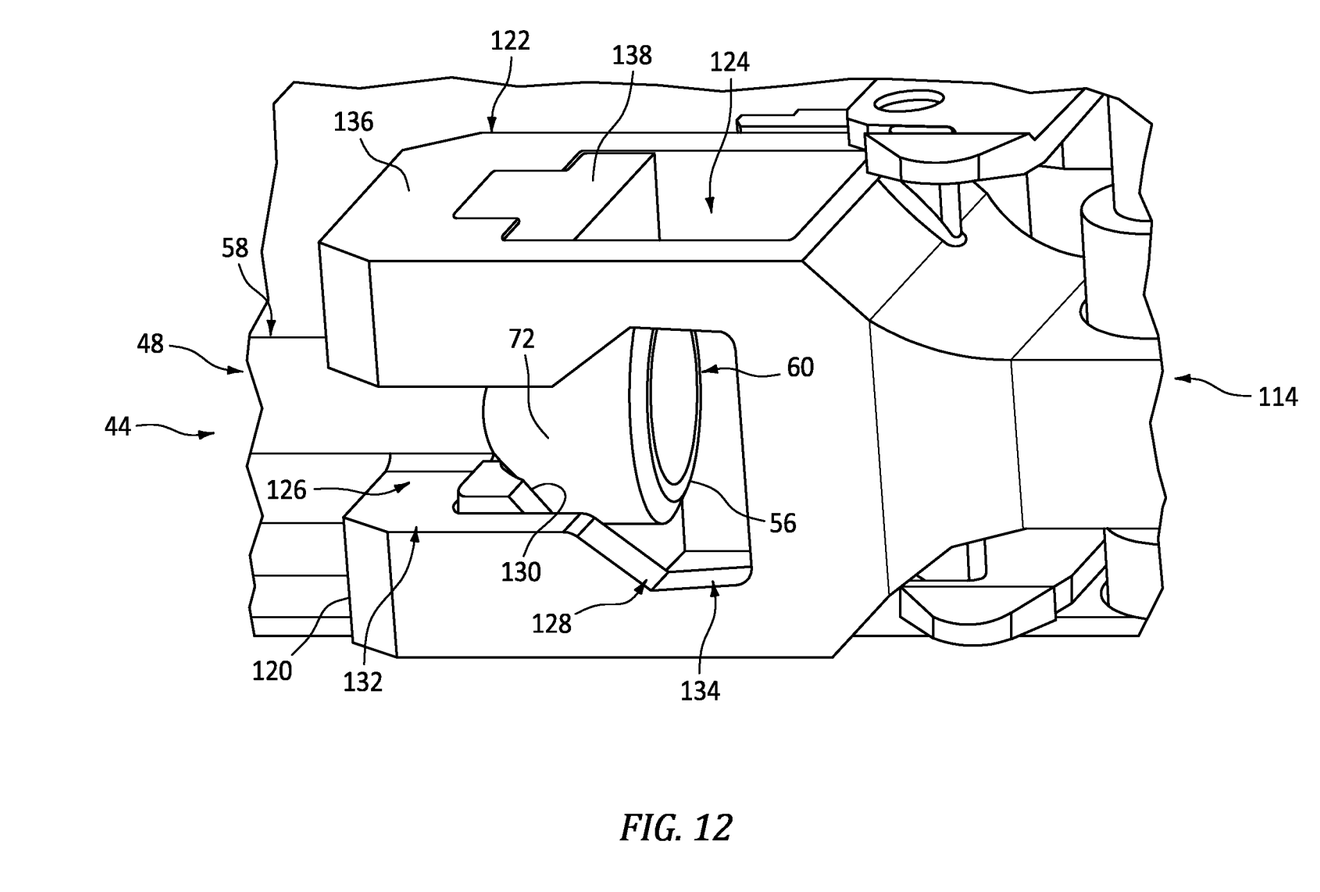
FIG. 12 is a partial perspective illustration of a latch assembly at an interface between the hook structure and the keeper.

The structure head 122 of FIG. 12 includes an outer support structure 136 (e.g., a frame, a cage, etc.) and a receiver 138 nested within the support structure 136. An example of the receiver 138 is shown in FIG. 11, which receiver 138 forms the hook bearing surface 130. Referring to FIG. 10, the receiver 138 may be secured to and within the support structure 136 using a fastener 140; e.g., a set screw. Here, the fastener 140 longitudinally fixes the receiver 138 within the support structure 136, where the receiver 138 is nested (e.g., interlocked) within the support structure 136 to prevent other movement between the hook structure members 136 and 138. The present disclosure, however, is not limited to such an exemplary multi-component configuration.

Figure 5:
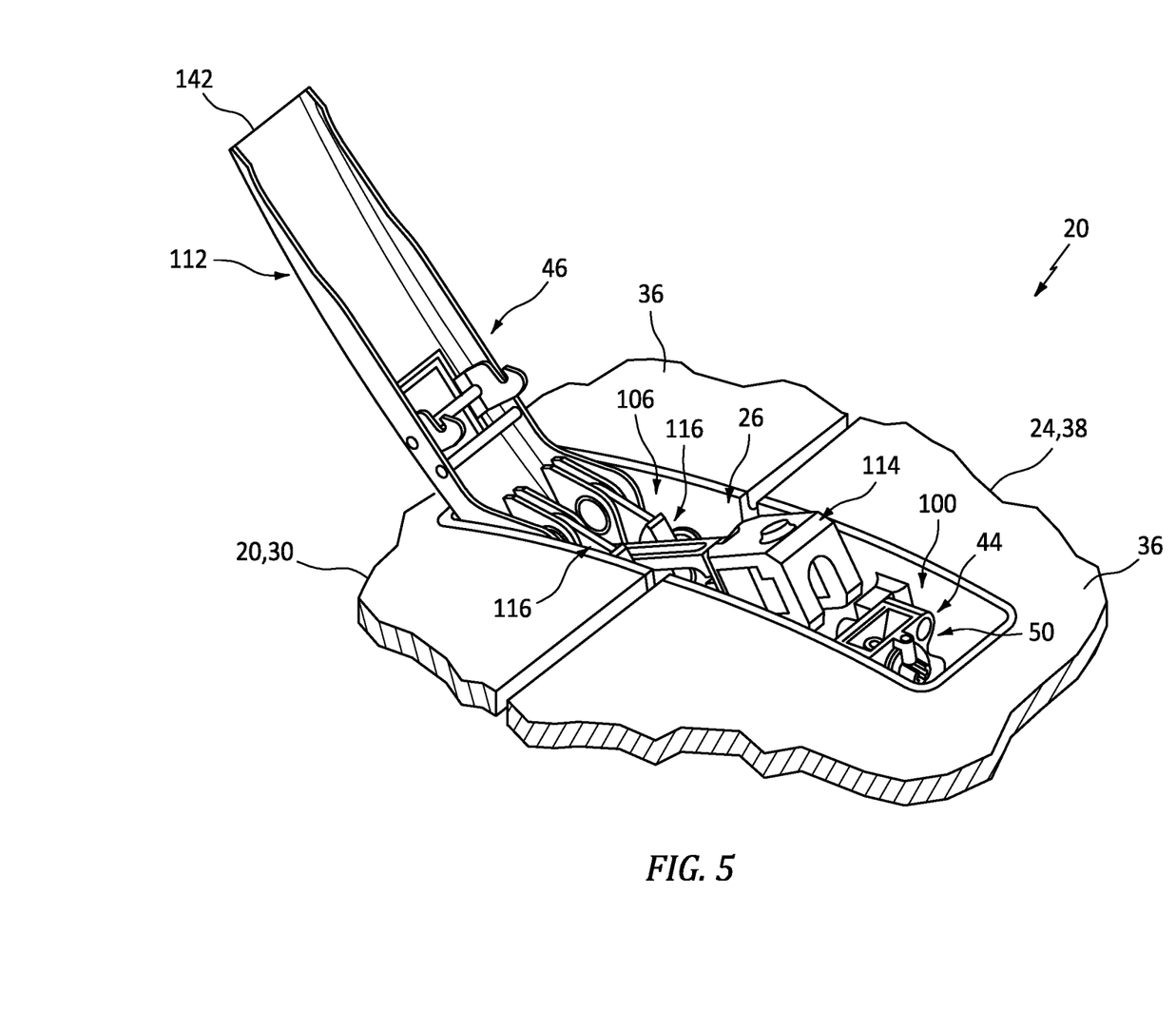
FIG. 5 is a partial cutaway perspective illustration of the aircraft assembly with its latch in an open position.

Referring to FIGS. 1 and 5, the handle 112 is configured to move between a fully closed position (e.g., see FIG. 1) and a fully open position (e.g., see FIG. 5). In the closed position of FIG. 1, the latch 46 and its members may be disposed within the fitting channels 100 and 106 and a base 142 of the handle 112 may be flush with the exterior aerodynamic surface 36. The hook structure 114 may also engage the keeper 48. More particularly, the structure head 122 (e.g., a hook) may latch onto (e.g., grasp, partially wrap around and contact, etc.) the keeper 48 and its keeper head 60. In this latched position, the head bearing surface 72 engages (e.g., contacts) the hook bearing surface 130. With this arrangement, (a) the keeper 48 and its keeper head 60 and (b) the structure head 122 and its receiver 138 may form a ball joint (e.g., a spherical bearing) at the interface between the head bearing surface 72 and the hook bearing surface 130. The keeper head 60 may thereby rotate slightly (e.g., +/−2-3° from center) in one or more or any radial direction relative to the centerline 52. This may facilitate up-and-down and/or side-to-side movement of the keeper 48 relative to the latch 46 and the first component 22. Thus, while the latch assembly 26 may maintain/secure the aircraft components 22 and 24 in their closed positions, the latch assembly 26 may also accommodate slight (e.g., up-and-down and/or side-to-side) misalignment between the aircraft components 22 and 24. Moreover, by accommodating slight misalignment between the aircraft components 22 and 24, the latch assembly 26 is less likely to be subject to a bending moment due to such a slight misalignment between the aircraft components 22 and 24.

In addition to accommodating misalignment, the latch assembly 26 may also include a safety feature. For example, by providing the structure slot 128 with its keyhole configuration, the keeper 48 and its keeper head 60 may (e.g., only) disengage from/separate from/unhook from the structure head 122 when it is aligned with the structure slot 128. Therefore, even where the latch 46 is unintentionally opened, forces pulling the aircraft components 22 and 24 apart may maintain the keeper head 60 within the structure receptacle 124. In other words, without proper and/or intentional alignment, it may be difficult for the keeper 48 and its keeper head 60 to unintentionally pass through the structure slot 128. However, coupling and uncoupling the keeper 48 from the hook structure 114 may be relatively simple for maintenance personnel where the propulsion system is stationary; e.g., where the aircraft is parked.

In the open position of FIG. 5, the latch 46 and its members may project out from the first fitting channel 106 and the handle base 142 may be angularly offset from the exterior aerodynamic surface 36. The hook structure 114 may also be disengaged from the keeper 48 (see FIG. 1). More particularly, the hook structure 114 may no longer latch onto and/or contact the keeper 48 (see FIG. 1). With this open/unlocked latch assembly arrangement, the latch 46 may be unlocked from the keeper 48 allowing the aircraft components 22 and 24 to move relative to one another; e.g., allowing pivoting open of one or more of the aircraft components 22 and 24.

Figure 13:
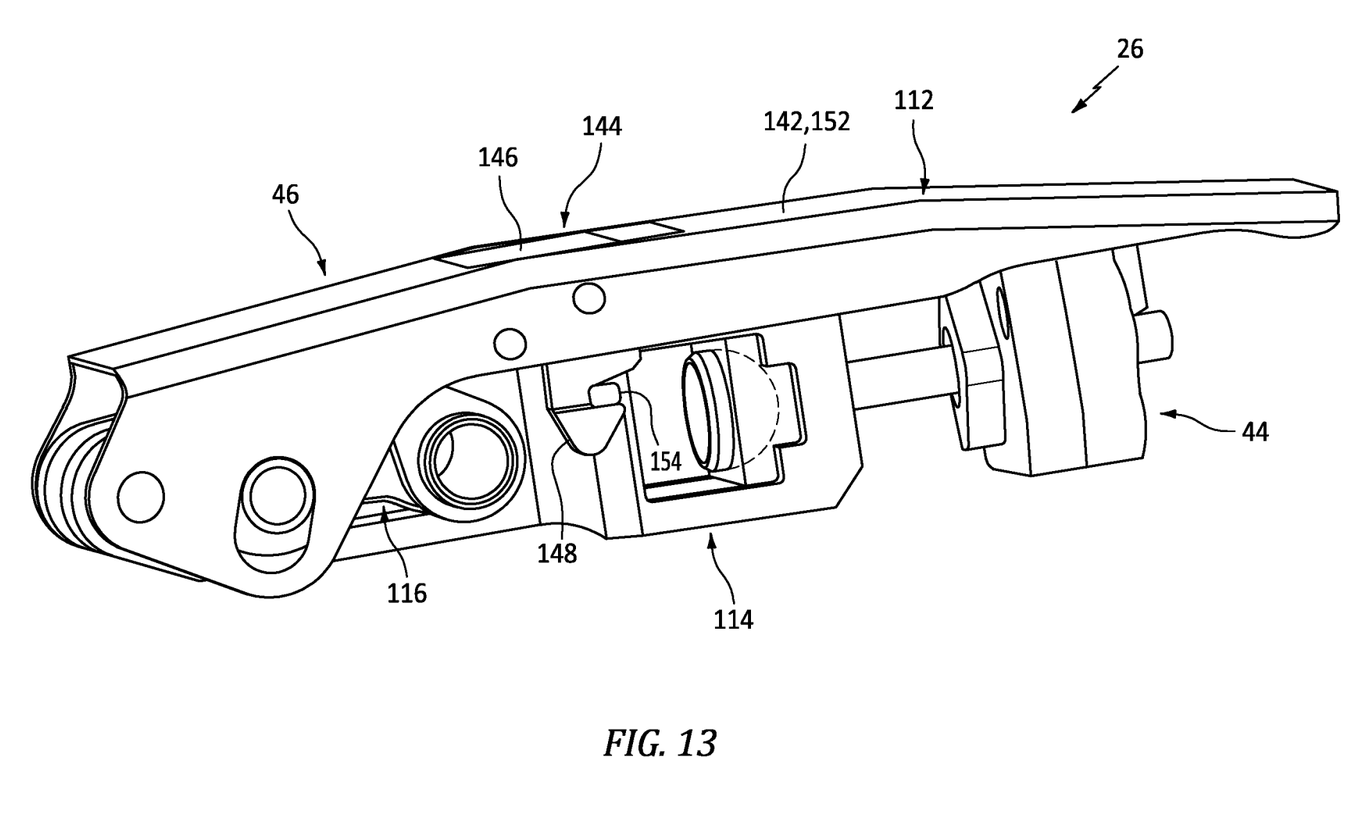
FIG. 13 is a perspective illustration of the latch assembly.
Figure 14A:
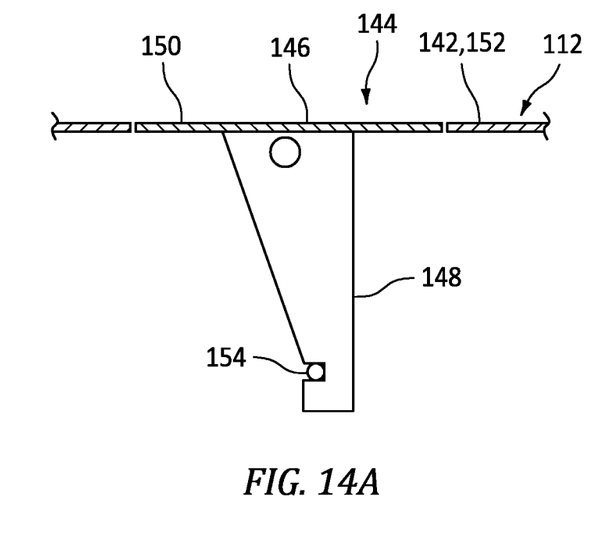
FIGS. 14A and 14B are schematic sectional illustrations of a portion of the latch assembly with a handle release device in various positions.
Figure 14B:
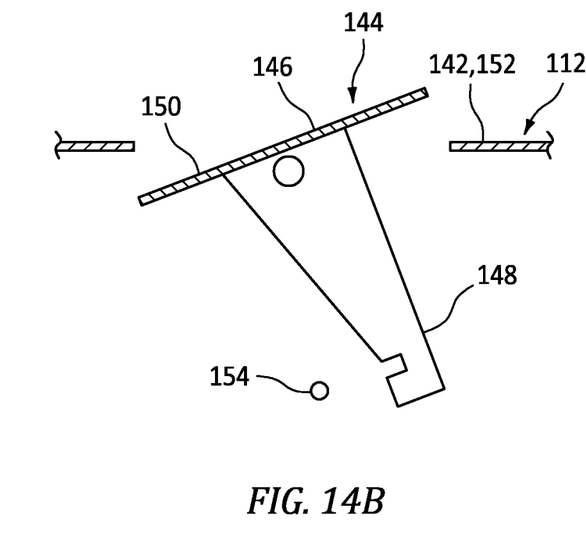

In some embodiments, referring to FIG. 13, the latch 46 may also include a handle release device 144. This handle release device 144 of FIG. 13 is pivotally coupled to the handle 112. The handle release device 144, for example, includes a push button 146 (e.g., a planar panel) and a device latch 148. The device latch 148 is connected to and projects out from the push button 146. This device latch 148 may be pivotally coupled to the handle 112 by a pin connection. With this arrangement, the handle release device 144 may pivot between a first (e.g., locked) position (e.g., see FIG. 14A) and a second (e.g., unlocked) position (e.g., see FIG. 14B). In the first position of FIGS. 14A, the push button 146 may be seated in an aperture (e.g., a port) through the handle base 142. The push button 146 and an exterior surface 150 of that push button 146 may be inline with (e.g., parallel and/or flush with) the exterior aerodynamic surface 36 (see FIGS. 1 and 5) and/or the handle base 142 and its exterior surface 152. The push button 146 may thereby be in an undepressed position. Here, the device latch 148 may engage (e.g., latch onto) one or more catches 154 on the hook structure 114 (one visible in FIG. 14A). With the handle release device 144 in its first position, the handle release device 144 may lock (e.g., secure) the handle 112 closed. By contrast, in the second position of FIG. 14B, the push button 146 may project into the handle 112 and the push button 146 and its exterior surface 146 may be angularly offset from the handle base 142 and/or the exterior aerodynamic surface 36 (see FIGS. 1 and 5). The push button 146 may thereby be in a depressed position. Here, the device latch 148 may disengage (e.g., release) the catch 154. With the handle release device 144 in its second position, the handle release device 144 unlocks the handle 112.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft, comprising:
a keeper comprising a keeper shaft and a keeper nut, a first keeper bearing surface with a semi-spherical geometry, and a second keeper bearing surface with a semi-spherical geometry, the keeper nut threaded onto the keeper shaft and comprising the second keeper bearing surface;
a mount comprising a mount bearing surface with a semi-spherical geometry, the second keeper bearing surface engaging the mount bearing surface; and
a latch including a handle and a hook structure operatively coupled to the handle, the handle configured to move between a closed position and an open position, the hook structure comprising a hook bearing surface with a semi-spherical geometry, the hook bearing surface engaged with the first keeper bearing surface when the handle is in the closed position, and the hook structure disengaged from the keeper when the handle is in the open position;
wherein the keeper nut further comprises one or more detents and one or more grips, the one or more detents arranged circumferentially about a centerline of the keeper shaft in an annular array, the one or more grips arranged circumferentially about the centerline of the keeper shaft, the one or more grips disposed longitudinally between the one or more detents and a keeper base end, wherein each of the one or more detents and each of the one or more grips is formed by a recess, a notch, or a blind aperture which projects partially into the keeper nut from the semi-spherical geometry of the second keeper bearing surface.

2. The assembly of claim 1, wherein
the first keeper bearing surface is a convex surface; and
the hook bearing surface is a concave surface.

3. The assembly of claim 1, wherein the keeper and the hook structure form a ball joint at an interface between the first keeper bearing surface and the hook bearing surface.

4. The assembly of claim 1, wherein
the keeper includes a keeper head connected to the keeper shaft;
the keeper head comprises the first keeper bearing surface; and
the first keeper bearing surface extends circumferentially around the centerline of the keeper shaft.

5. The assembly of claim 4, wherein the first keeper bearing surface is contiguous with a cylindrical surface of the keeper shaft.

6. The assembly of claim 4, wherein
the hook structure includes a structure head and a receptacle within the structure head, and the hook bearing surface partially forms the receptacle; and
the keeper head is received within the receptacle when the hook bearing surface is engaged with the first keeper bearing surface.

7. The assembly of claim 6, wherein
the hook structure further includes a channel extending longitudinally through the structure head to the hook bearing surface and the receptacle; and
the keeper shaft projects longitudinally out from the keeper head and through the channel.

8. The assembly of claim 6, wherein
the hook structure further includes a keyhole slot extending radially into the structure head to the receptacle; and
the keeper head is configured to pass radially through the keyhole slot between the receptacle and an exterior to the hook structure.

9. The assembly of claim 8, wherein the keyhole slot has a cross-sectional shape that matches a sectional shape of a portion of the keeper at the keeper head.

10. The assembly of claim 1, wherein
the second keeper bearing surface is a convex surface; and
the mount bearing surface is a concave surface.

11. The assembly of claim 1, wherein the keeper and the mount form a ball joint at an interface between the second keeper bearing surface and the mount bearing surface.

12. The assembly of claim 1, wherein
the second keeper bearing surface extends circumferentially around the centerline of the keeper shaft.

13. The assembly of claim 12, wherein the keeper nut is retained within a receptacle of the mount, and the mount bearing surface partially forms the receptacle.

14. The assembly of claim 12, where at least one of
the keeper shaft is rotationally fixed relative to the mount; or
the keeper nut is rotationally fixed relative to the mount.

15. The assembly of claim 1, further comprising:
a fixed structure;
a first aircraft component pivotally attached to the fixed structure, the latch mounted to the first aircraft component; and
a second aircraft component pivotally attached to the fixed structure, the keeper mounted to the second aircraft component.

16. An assembly for an aircraft, comprising:
a mount comprising a mount bearing surface with a semi-spherical geometry;
a keeper comprising a keeper nut, a first keeper bearing surface with a semi-spherical geometry and a second keeper bearing surface with a semi-spherical geometry, the first keeper bearing surface engaging the mount bearing surface; and
a latch including a handle and a hook structure operatively coupled to the handle, the handle configured to move between a closed position and an open position, the hook structure engaged with the keeper when the handle is in the closed position, and the hook structure disengaged from the keeper when the handle is in the open position,
wherein the hook structure comprises a hook bearing surface with a semi-spherical geometry, and the hook bearing surface is engaged with the second keeper bearing surface when the handle is in the closed position; and
wherein the first keeper bearing surface includes an array of detents and an array of grips, the array of detents arranged circumferentially about a centerline of the keeper, and the array of grips arranged circumferentially about the centerline, the array of grips disposed longitudinally between the array of detents and a keeper base end, wherein each of the array of detents and each of the array of grips is formed by a recess, a notch, or a blind aperture which projects partially into the keeper nut from the semi-spherical geometry of the first keeper bearing surface.

17. An assembly for an aircraft, comprising:
a mount, the mount comprising a mount bearing surface;
a keeper coupled to the mount through a first bearing, the keeper including a first keeper bearing surface, a second keeper bearing surface with a semi-spherical geometry, a keeper shaft and a keeper nut threaded onto the keeper shaft; and
a latch including a handle and a hook structure operatively coupled to the handle, the handle configured to move between a closed position and an open position, the hook structure comprising a hook bearing surface, the hook structure engaged with the keeper when the handle is in the closed position, the hook structure coupled to the keeper through a second bearing when the hook structure is engaged with the keeper, and the hook structure disengaged from the keeper when the handle is in the open position;
wherein:
the keeper shaft is rotationally fixed relative to the mount and/or the keeper nut is rotationally fixed relative to the mount,
the keeper and the hook structure form a ball joint at an interface between the first keeper bearing surface and the hook bearing surface, and
the keeper and the mount form a ball joint at an interface between the second keeper bearing surface and the mount bearing surface;
wherein the keeper nut further comprises one or more detents and one or more grips, the one or more detents arranged circumferentially about a centerline of the keeper shaft in an annular array, the one or more grips arranged circumferentially about the centerline of the keeper shaft, the one or more grips disposed longitudinally between the one or more detents and a keeper base end, wherein each of the one or more detents and each of the one or more grips is formed by a recess, a notch, or a blind aperture which projects partially into the keeper nut from the semi-spherical geometry of the second keeper bearing surface.

* * * * *